United States Patent [19]

Hara

[11] Patent Number: 4,592,913

[45] Date of Patent: Jun. 3, 1986

[54] METHOD OF PRODUCING AN ARTIFICIAL TRUFFLE

[75] Inventor: Tatsuro Hara, Takarazuka, Japan

[73] Assignee: Sun Food Co., Ltd., Amagasaki, Japan

[21] Appl. No.: 675,712

[22] Filed: Nov. 28, 1984

[30] Foreign Application Priority Data

Dec. 1, 1983 [JP] Japan .................................. 58-227243

[51] Int. Cl.$^4$ ................................................ A23L 1/04
[52] U.S. Cl. ..................................... 426/104; 426/250; 426/575; 426/661; 426/656
[58] Field of Search ............... 426/250, 658, 573, 575, 426/578, 615, 629, 634, 661, 803, 512, 656, 104

[56] References Cited

U.S. PATENT DOCUMENTS

| | | | |
|---|---|---|---|
| 3,318,703 | 5/1967 | Geldof | 426/250 |
| 3,362,831 | 1/1968 | Szczesniak | 426/104 |
| 3,873,749 | 3/1975 | Carpenter et al. | 426/573 |
| 4,436,759 | 3/1984 | Trelling | 426/575 |

*Primary Examiner*—Raymond N. Jones
*Assistant Examiner*—Carolyn Paden
*Attorney, Agent, or Firm*—Marshall, O'Toole, Gerstein, Murray & Bicknell

[57] ABSTRACT

This disclosure relates to a method of producing an artificial truffle and to a composition forming an artificial truffle. The method includes the steps of mixing quantities of alginic acid, protein and starch with water, kneading the mixture, forming the kneaded mixture into one or more balls resembling the shape of a natural truffle, immersing the ball or balls in a solution of calcium salt until the balls have hardened, removing the balls from the solution, forming a seasoning liquid containing seasoning and flavor, and immersing the balls in the liquid.

10 Claims, No Drawings

METHOD OF PRODUCING AN ARTIFICIAL TRUFFLE

BACKGROUND OF THE INVENTION

The present invention relates to a method of producing an artificial truffle.

A natural truffle has a unique flavor and smell, and it is indispensable to quality French cuisine. Truffles are only produced in the Perigord area of southern France and the Spanish territory adjacent to it, and their output has been declining year after year while the demand has increased.

Accordingly, some pastes imitating natural truffles have been made and introduced in the market. Such pastes have been, however, mere imitations utterly different from the natural truffle. A truffle is a kind of fungus and a plant, whereas the imitations have been made mostly of lard, pork or simple starch, and are quite different from the natural truffle in flavor, smell, etc.

The present inventor disclosed a method of producing an artificial truffle in Japanese Patent Provisional Publication No. 58-126749 laid open July 28, 1983, and the method disclosed therein is based on a basic idea of selecting main components entirely from vegetable substances. A product made by this method is little different in flavor and smell from the natural truffle, but it has something to be desired in the sense of eating, or texture. Further, as the foregoing method placed emphasis on the convenience in the use of the product, no consideration was given to make the appearance of the product similar to the natural truffle. Accordingly, the appearance of the product made by the above method was also different from that of the natural truffle.

The present invention provides a method of producing an improved artificial truffle. It is an object of this invention to achieve a sense of taste and eating close to that of the natural truffle, which is unique to this fungi, and also to imitate the appearance of the natural truffle.

BRIEF SUMMARY OF THE INVENTION

A method of producing an artificial truffle in accordance with this invention comprises the steps of mixing quantities of sodium alginate, protein and starch with water, kneading the mixture, forming the kneaded mixture into one or more balls resembling the shape of a natural truffle, immersing the ball or balls in a solution of calcium salt until the balls have hardened, removing the balls from the solution, forming a seasoning liquid containing seasoning and flavor, and immersing the balls in the liquid.

DETAILED DESCRIPTION OF THE INVENTION

Firstly, to achieve a sense of eating or texture close to that of the natural truffle, which is unique to this fungi, an optimum fibrous substance was selected. A suitable fibrous substance must be stable against the thermal effects of cooking when the product is used as an ingredient of a stew or soup.

A variety of samples were tested, and alginic acid in the form of calcium salt was found to have a close resemblance, in the sense of texture when chewed, to the natural truffle and be optimum in terms of its thermal stability. Alginic acid is available on the market as a sodium salt which is convertible into a calcium salt in the herein disclosed process of production of the artificial truffle. A variety of soluble calcium salts are usable, such as calcium chloride and calcium acetate. With a view toward the safety of food additives, it is desirable to use calcium lactate.

Secondly, in order to secure the smoothness and stickiness of texture unique to the natural truffle, an optimum protein and starch were selected. Soybean protein or albumen was selected as the protein component, and cyclodextrin (C.D.) is the preferred starch component. C.D. is a derivative of starch which has the empirical formula $(C_6H_{10}O_5)_n$ where "n" equals 6, 7 or 8 and can be represented by the structural formula:

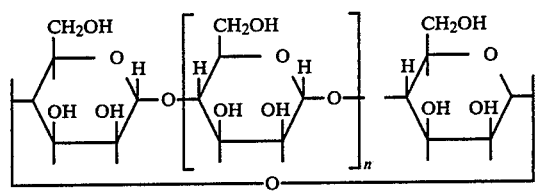

n = 6 α-cyclodextrin
n = 7 β-cyclodextrin
n = 8 γ-cyclodextrin

C.D. has the ability of strongly absorbing odors and works to remove the strong odor of a garlic extract which is preferably used as a trace element in the truffle composition, as will be explained hereinafter.

Lastly, a selection of trace elements was added which are contained in the natural truffle and have restorative effects. Ginseng and garlic have restorative effects similar to that of the truffle and were found to be most suitable. Garlic extractives were selected because of cost considerations.

Accordingly, approximately 7-15, preferably about 10, parts by weight of sodium alginate selected as the fibrous component, approximately 2.5 parts by weight of soybean protein or albumen selected as the protein component, approximately 1 part by weight of cyclodextrin selected as the starch component, approximately 0.5 part by weight of garlic extractives selected as the trace elements, approximately 2.5 parts by weight of black pigment, approximately 3 parts by weight of vegetable oil are mixed with approximately 80 parts by weight of water, and the mixture is kneaded. Then, the dough is formed into balls or spheres each weighing about 10 g, with rough surface. The spheres are immersed in 3% calcium lactate solution for about 20 hours to harden them during which time the sodium alginate is converted to calcium alginate.

After the hardening process, the balls are washed well with water to wash away the calcium lactate from their surfaces, and the balls are then immersed and preserved in an appropriate prepared seasoning liquid.

The optimum quantity of the sodium alginate is about 9 to 10 parts by weight. When the quantity is below this level, the product is too soft because it has an excessive water content, and when the quantity is above this level, the product is too hard because it has insufficient water content, and as a result, the product has an unsatisfactory sense of eating.

The reason for immersing the spheres in the seasoning liquid to give the spheres smell and taste after, rather than before, the completion of the hardening step, is because the smell and taste may be eluted due to osmotic pressure, if the seasoning were present when the balls are immersed in the calcium lactate hardening solution.

According to the method of production of the present invention as described so far, it is possible to produce an artificial truffle which gives a sense of eating close to that of the natural truffle, unique to fungi, and of which the appearance is very close to that of the natural truffle. The method of production has the merit of being able to provide artificial truffles in large quantities at low costs, at any time to meet the demand.

The following are examples of the present invention:

EXAMPLE 1

100 g of sodium alginate, 25 g of soybean protein, and 10 g of β-cyclodextrin (C.D.) were combined with 700 cc of boiling water, and the mixture kneaded in a mixer for about 10 minutes.

Secondly, 25 g of black pigment, such as carbon powder made from rape seed oil, was dissolved in 140 cc of water, and this solution was added to the kneaded substance while kneading was continued. Further, 5 g of garlic extractives and 30 g of vegetable oil, such as soybean oil, were added little by little while the mixture was kneaded for about 10 minutes.

The kneaded substance was taken out of the mixer, and was formed into balls or spheres weighing about 10 g each with a rough surface. The spheres were immersed in 2 liters of 3% calcium lactate solution.

After about 20 hours, the hardened kneaded balls were taken out of the solution and washed with water, and then the balls were immersed and preserved in about 1800 cc of seasoning liquid.

As a result, hardened kneaded balls which once weighed about 10 g each were swollen by absorbing the seasoning liquid to produce appropriate spherical artificial truffles, about 25 mm in diameter, and about 12 g in weight.

The seasoning liquid was prepared by dissolving 50 g of a seasoning composition mainly consisting of amino acids, 1.5 g of truffle flavor, and 10 g of sodium sorbate in 1800 cc of water.

The active ingredients of the seasoning composition consist of a mixture of amino acids sold under the trade name "Amiflex A1-2", produced by TAKEDA YAKUHIN K.K. of 2-27 Dosyo-machi, Higashi-ku, Osaka, Japan. The following amino acids are present in the seasoning composition:

| Amino Acids | Wt. Percent |
| --- | --- |
| Lysine | 1.24 |
| Histidine | 0.94 |
| Arginine | 1.73 |
| Asparagine acid | 3.58 |
| Threonine | 1.84 |
| Serine | 3.25 |
| Glutamic acid | 20.41 |
| Proline | 7.43 |
| Glycine | 2.21 |
| Alanine | 2.81 |
| Cystine | 0.26 |
| Valine | 1.79 |
| Methionine | 0.44 |
| Isoleucine | 0.82 |
| Leucine | 1.58 |
| Tyrosine | 0.21 |
| Phenylalanine | 1.82 |
| Total | 52.36 |

The truffle flavor used in the seasoning liquid may be a commercial artificial truffle flavor. For example, Truffle Flavor PG 7474 or Truffle Flavor No. 7074 sold by Takata Koryo K.K. of 7-22-2 Tsukaguchihonmachi, Amagasaki Japan may be used in an amount between 1-2 grams.

In this way, an artificial truffle, which was nearly indistinguishable from the natural truffle in terms of appearance, sense of eating, flavor, etc. was successfully produced.

EXAMPLE 2

90 g of sodium alginate, 25 g of powderized albumen, 10 g of β-cyclodextrin (C.D.) were put into 700 cc of water, and the mixture was kneaded in a mixer for about 10 minutes.

Secondly, a very small quantity of brown pigment, such as cocao bean dye extract, was dissolved in 140 cc of water, and the solution was added to the kneaded substance while kneading was continued.

Further, 5 g of garlic extractives and 30 g of vegetable oil, such as olive oil, were added little by little while the mixture was kneaded for about 10 minutes.

The kneaded substance was taken out of the mixer, and was formed into spheres weighing about 10 g each having a rough surface. The spheres were immersed in 2 liters of 3% calcium lactate solution.

After about 20 hours, the hardened kneaded substances were taken out of the solution and washed with water, and then immersed and preserved in a seasoning liquid.

The seasoning liquid was prepared by dissolving 50 g of a seasoning mainly consisting of amino acids, 1.0 g of truffle flavor, and 1 g of sodium sorbate in 1800 cc of water.

In this way, an artificial truffle, which was nearly indistinguishable from the natural truffle in terms of appearance, sense of eating, flavor, etc. was successfully produced.

If desired to achieve a texture or sense of eating even closer to that of the natural truffle, there may also be included a quantity of carboxymethylcellulose or a natural gum powder such as gum arabic or xanthone gum. This component may be added to the sodium alginate, protein and starch and mixed with the water before kneading.

To achieve the appropriate color, black and/or brown pigments may be added as mentioned. Such pigments may comprise common vegetable dyes. For example, the black pigment may be carbon powder derived from rape seed oil, and the brown pigment may be a dye derived from cocao.

The albumen used in the Example 2 may be a natural dried albumen powder made from chicken eggs. The vegetable oil used in the examples was sirasimeyu (i.e. soybean oil) extracted from soybeans, but other vegetable oils may be used, such as olive oil and salad oil.

What is claimed is:

1. A method of producing artificial truffles, comprising the steps of mixing approximately 7-15 parts by weight of sodium alginate, approximately 2.5 parts by weight of protein and approximately 1 part by weight of starch with water, kneading the mixture, forming the mixture into one or more balls resembling a truffle, immersing the ball in an approximately 3% soluble calcium salt solution for hardening, removing the ball from the solution after hardening, preparing a seasoning liquid by dissolving substantially 50 g of a seasoning composition comprising amino acids, substantially 1.5 g of truffle flavor, and substantially 1 g of sodium sorbate in substantially 1800 cc of water, and immersing the ball in said seasoning liquid for a period of time sufficient to impart smell and taste to said ball.

2. The method of claim 1, wherein said protein is derived from soybeans, and said starch comprises cyclodextrin.

3. A method of producing artificial truffles, comprising the steps of mixing approximately 7-15 parts by weight of alginic acid, approximately 2.5 parts by weight of protein and approximately 1 part by weight of starch with water, kneading the mixture, forming the mixture into one or more balls resembling a truffle, immersing the ball in an approximately 3% soluble calcium salt solution for hardening, removing the ball from the solution after hardening, preparing a seasoning liquid by dissolving substantially 50 g of a seasoning composition comprising amino acids, substantially 1.5 g of truffle flavor, and substantially 1 g of sodium sorbate in substantially 1800 cc of water, and immersing the ball in a seasoning liquid for a period of time sufficient to impart smell and taste to said ball.

4. The method of claim 3, wherein said protein is derived from soybeans, and said starch comprises cyclodextrin.

5. The method of claim 3, wherein said alginic acid is in the form of calcium salt.

6. A food product formed by the method of claim 1, comprising at least one ball including approximately 7-15 parts by weight of sodium alginate, approximately 2.5 parts by weight of protein and approximately 1 part by weight of starch mixed with water, an approximately 3% soluble calcium salt solution adsorbed on said ball for hardening and a seasoning liquid adsorbed on said ball, said seasoning liquid comprising substantially 50 g of a seasoning composition dissolved in substantially 1800 cc of water, said seasoning composition comprising amino acids, substantially 1.5 g of truffle flavor, and substantially 1 g of sodium sorbate.

7. The product of claim 6, wherein said protein comprises a soybean protein, and said starch comprises cyclodextrin.

8. The product of claim 6, and further comprising a garlic extract.

9. The product of claim 6, and further comprising a dark pigment.

10. The product of claim 6, wherein said seasoning liquid comprises amino acids, truffle flavor and sodium sorbate.

* * * * *